United States Patent
Brunazzi et al.

(10) Patent No.: US 7,484,437 B2
(45) Date of Patent: Feb. 3, 2009

(54) TRANSMISSION UNIT PARTICULARLY FOR DRIVING THE SCREW FEEDERS AND AUXILIARY USER DEVICES OF MIXING TRUCKS

(75) Inventors: Achille Brunazzi, Santa Vittoria Di Gualtieri (IT); Andrea Gallo, Reggio Emilia (IT); Fausto Mora, Suzzara (IT)

(73) Assignee: Comer Industries S.p.A., Localita' Villanova - Reggiolo (IT)

( * ) Notice: Subject to any disclaimer, the term of this patent is extended or adjusted under 35 U.S.C. 154(b) by 211 days.

(21) Appl. No.: 11/217,610

(22) Filed: Sep. 2, 2005

(65) Prior Publication Data

US 2006/0050604 A1 Mar. 9, 2006

(30) Foreign Application Priority Data

Sep. 9, 2004 (IT) .......................... MO2004A0226

(51) Int. Cl.
*F16H 57/08* (2006.01)
*F16H 3/00* (2006.01)
*B60K 17/00* (2006.01)

(52) U.S. Cl. ....................... 74/810.1; 475/331; 180/344

(58) Field of Classification Search ................ 74/810.1; 56/344; 475/91, 116, 331; 180/344
See application file for complete search history.

(56) References Cited

U.S. PATENT DOCUMENTS

| 2,912,885 | A | 11/1959 | Ginn |
| 3,523,411 | A | 8/1970 | Waldrop et al. |
| 3,924,491 | A | 12/1975 | Kalversberg et al. |
| 6,318,056 | B1 | 11/2001 | Rauch et al. |
| 2004/0093841 | A1 | 5/2004 | Clauss |

FOREIGN PATENT DOCUMENTS

| DE | 199 18 552 A1 | 10/2000 |
| EP | 0 001 348 A | 4/1979 |
| EP | 0 054 253 A | 6/1982 |
| EP | 1 064 840 A | 1/2001 |
| GB | 676 055 A | 7/1952 |
| GB | 2 169 366 A | 7/1986 |

*Primary Examiner*—Tisha D Lewis
(74) *Attorney, Agent, or Firm*—Modiano & Associati; Albert Josif; Daniel J. O'Byrne

(57) ABSTRACT

A transmission unit particularly for driving screw feeders and auxiliary user devices of mixing trucks, comprising an off-center distribution device, which can be associated with an external power take-off and forms couplings for the connection of auxiliary user devices; a reduction unit, which is functionally connected to the off-center distribution device and can be associated with the screw feeders of a mixing truck; and a main friction clutch device, which is interposed between the off-center distribution device and the reduction unit, a device for reversing the direction of rotation of the screw feeders and an auxiliary friction clutch device for the reversing device.

21 Claims, 4 Drawing Sheets

TRANSMISSION UNIT PARTICULARLY FOR DRIVING THE SCREW FEEDERS AND AUXILIARY USER DEVICES OF MIXING TRUCKS

The present invention relates to a transmission unit particularly for driving the screw feeders and auxiliary user devices of mixing trucks.

BACKGROUND OF THE INVENTION

As is known, mixing trucks are machines used in the agricultural field, particularly in animal farms, for mixing forage and optionally reducing its dimensions and volume.

These trucks are constituted substantially by a body inside which there are screw feeders, generally two contrarotating screw feeders, which are turned by a transmission unit, which draws its motion from a power take-off of a farming tractor by means of a cardan shaft or the like.

The screw feeders can be provided with blades which shred the forage in addition to mixing it.

Among mixing trucks, desiling and mixing trucks are known in particular which in addition to mixing and optionally shredding the forage also remove it from storage silos and load it into the body of the truck (desiling) by means of a loading mill.

Desiling occurs generally while the screw feeders are moving; there is in fact a permanent functional connection, so that the actuation of the loading mill entails the automatic actuation of the screw feeders.

In order to separate the actuation of the screw feeders from the actuation of the loading mill or of any other auxiliary user devices, reduction units are known which are the subject of Italian industrial invention patent application No. MI2001A00436 and of the corresponding European patent EP1,236,606 in the name of the same Applicant and are substantially constituted by an off-center gearbox, which can be associated with the power take-off of a tractor and forms couplings for connection to auxiliary user devices, by a reduction unit which is functionally collected to the off-center gearbox, and by a friction clutch, which is interposed between the off-center gearbox and the reduction unit and allows to interrupt the transmission of motion to the screw feeders but not to the auxiliary user devices.

However, these known reduction units are susceptible of further improvements.

In particular, it is noted that if the truck jams as a consequence of an excessive accumulation of forage between the screw feeders which blocks them, it is necessary to stop its operation and reverse the direction of rotation of the screw feeders in order to remove the forage that is stuck between them.

In known mixing trucks, such unblocking operation is performed by disconnecting manually the power take-off from the main input shaft of the reduction unit and connecting it to a shaft that is adjacent thereto, so as to reverse the direction of rotation in output from the reduction unit.

This operation entails performing particularly time-consuming and labor-intensive maneuvers, which slow the preparation of the fodder and by being performed manually endanger the safety of the operators.

Further, this operation entails the need to provide in the reduction unit an auxiliary input, which is constructively complicated and entails substantial bulk, which can interfere with the devices for protecting the cardan shaft or with the auxiliary user devices connected to the off-center gearbox; moreover, such user devices must be of the bidirectional type.

As an alternative, if the tractor is provided with a power take-off that can be synchronized with the reverse gear, it is possible to reverse the direction of rotation of the screw feeders by driving the truck backward, a maneuver which in itself is not advisable for safety reasons.

In reduction units provided with a friction clutch, the rotation rate generated in reverse gear and transmitted to the auxiliary user devices, particularly to the pump of the hydraulic circuit that drives the coupling of the clutch device, can be disadvantageously lower than the rotation rate required to generate the necessary pressure for the coupling of the device; accordingly, the screw feeders remain motionless and the truck remains jammed. Finally, it is noted that the operations for detecting the jamming of the truck and the release operations are performed and controlled manually by the assigned operators; therefore, they are generally performed late and/or for excessively long times, subjecting the screw feeders and the rotary motion transmission elements to overloads and stresses which, over time, compromise their integrity and correct operation.

SUMMARY OF THE INVENTION

The aim of the present invention is to eliminate the drawbacks mentioned above, by providing a transmission unit particularly for driving screw feeders and auxiliary user devices of mixing trucks which allows to reverse the direction of rotation of the screw feeders simply and rapidly, minimizing, if not eliminating, the need for intervention of assigned operators.

Within this aim, an object of the present invention is to provide a transmission unit which allows to reverse the direction of rotation of the screw feeders but not the direction of rotation of the auxiliary user devices, eliminating the use of bidirectional user devices, and to ensure in input to such user devices a power (rotation rate) that is sufficient for their correct operation.

Another object of the present invention is to provide a transmission unit that ensures the safety of the assigned operators.

A further object of the present invention is to provide a transmission unit that is constructively and structurally simple, has compact dimensions and can be easily installed on known trucks and connected to the power take-off of known tractors without requiring any modification thereof.

Finally, another object of the present invention is to provide a transmission unit that allows to detect automatically any jamming of the trucks and to control the time for which the direction of rotation of the screw feeders is reversed, limiting the overloads that act on the transmission elements.

Not last object of the present invention is to provide a transmission unit having a structure that is simple, relatively easy to provide in practice, safe in use, effective in operation, and has a relatively low cost.

This aim and these and other objects that will become better apparent hereinafter are achieved by the present transmission unit particularly for driving screw feeders and auxiliary user devices of mixing trucks, comprising: an off-center distribution device, which can be associated with an external power take-off and forms couplings for the connection of auxiliary user devices; a reduction unit, which is functionally connected to said off-center distribution device and can be associated with the screw feeders of a mixing truck; and a main friction clutch device, which is interposed between said off-center distribution device and said reduction unit, characterized in that it comprises a device for reversing the direction of rotation of said screw feeders and an auxiliary friction clutch device for said reversing device.

BRIEF DESCRIPTION OF THE DRAWINGS

Further characteristics and advantages of the present invention will become better apparent from the following detailed description of a preferred but not exclusive embodiment of a transmission unit particularly for driving the screw feeders and auxiliary user devices of mixing trucks, illustrated by way of non-limiting example in the accompanying drawings, wherein.

DESCRIPTION OF THE PREFERRED EMBODIMENTS

Figure 1:
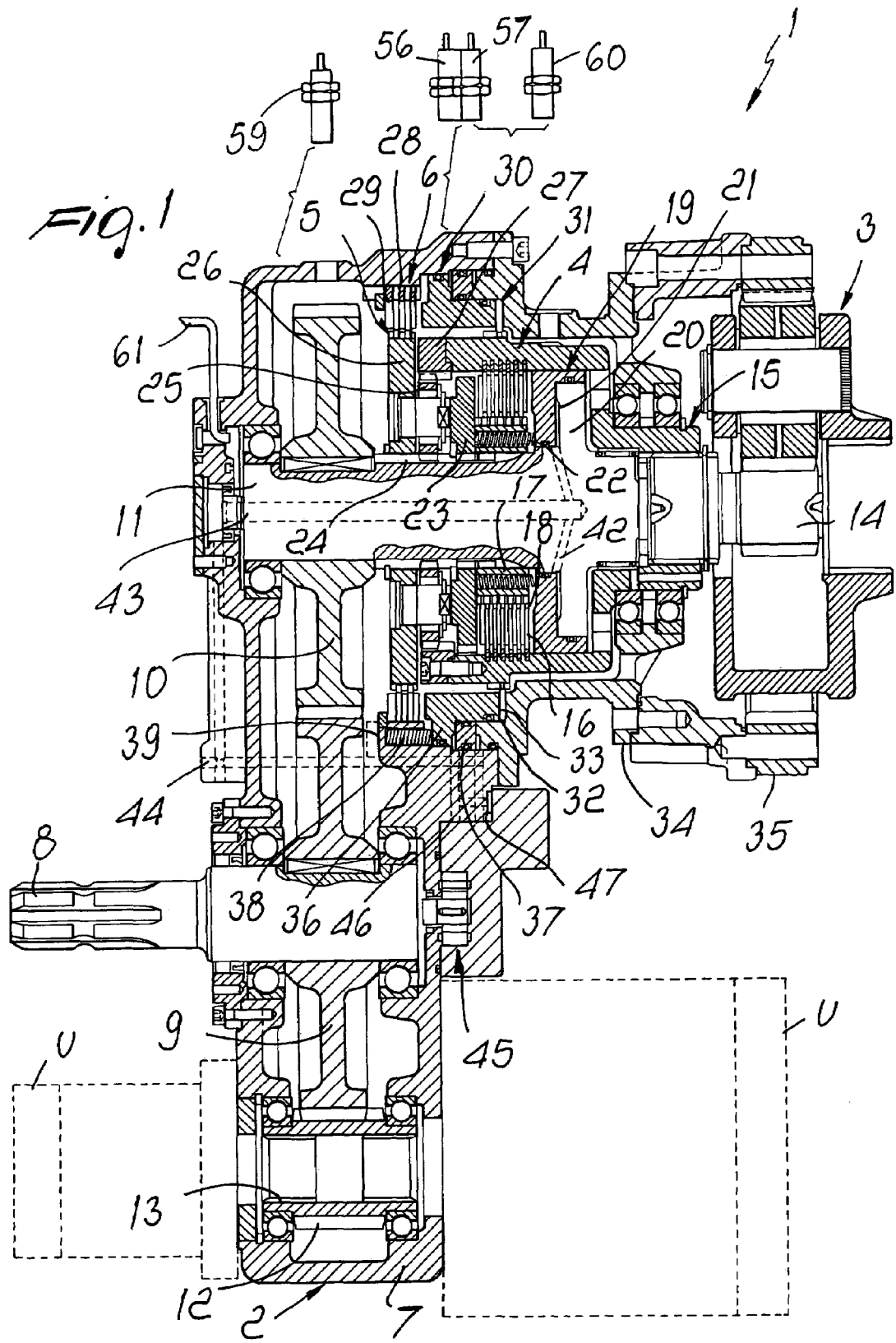
FIG. 1 is a schematic sectional view of the transmission unit according to the invention.
Figure 2:
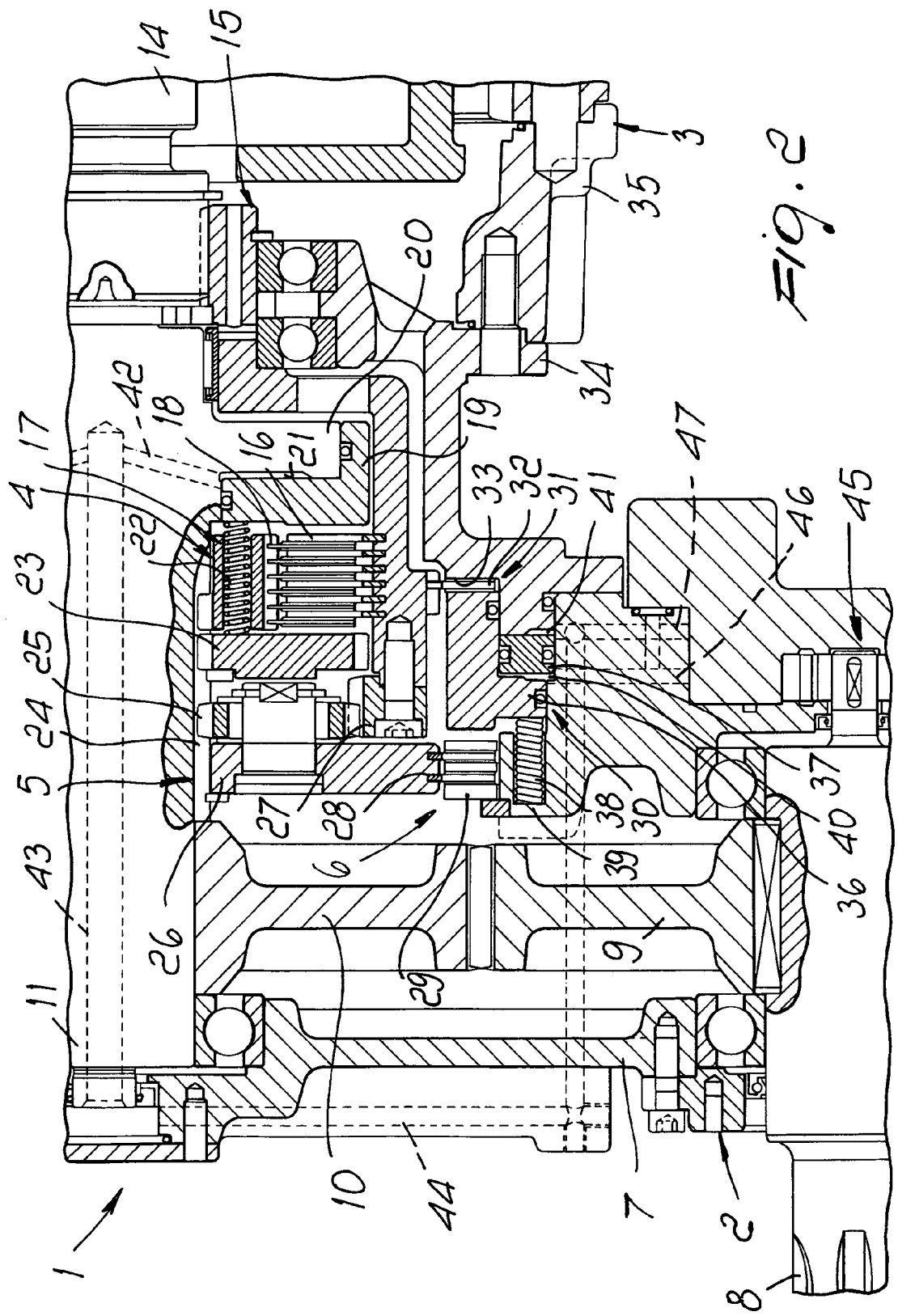
FIG. 2 is an enlarged-scale view of a detail of FIG. 1.
Figure 3:
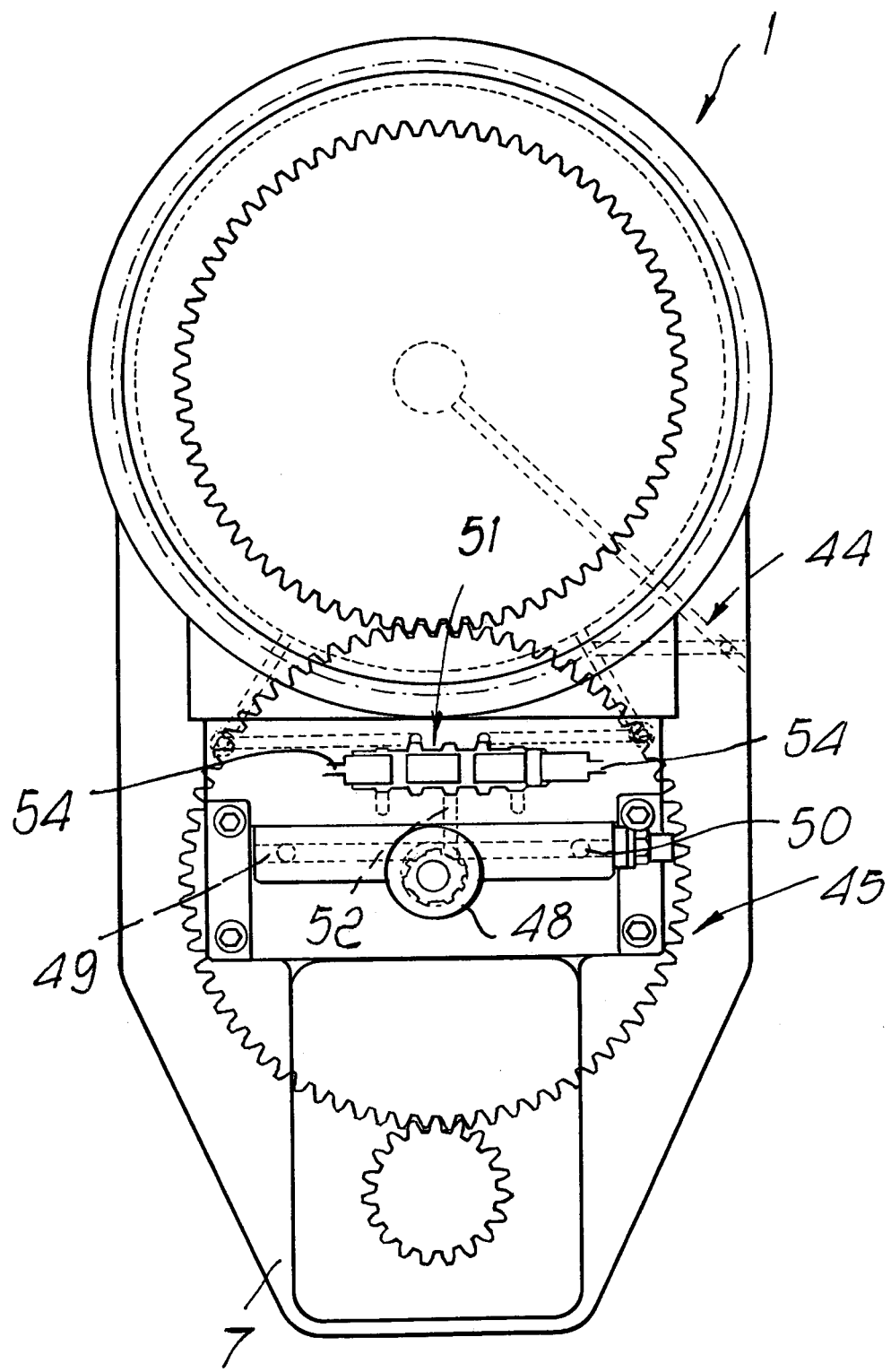
FIG. 3 is a schematic front view, shown in phantom lines, of the hydraulic circuit of the transmission unit according to the invention.
Figure 4:
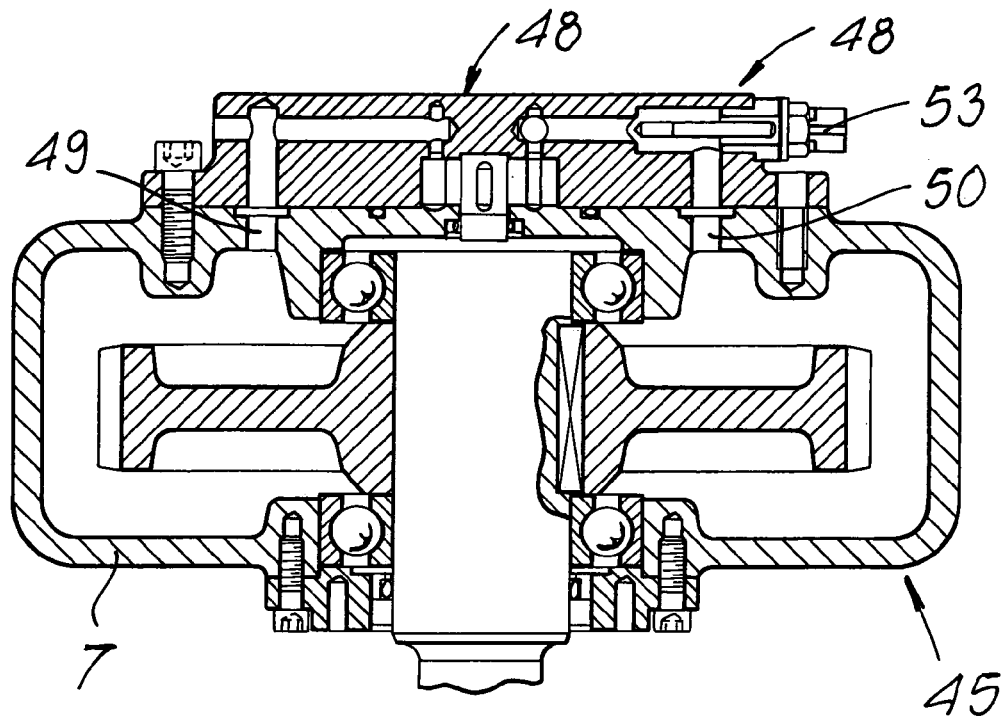
FIG. 4 is a schematic plan view, shown in phantom lines, of the hydraulic circuit of the transmission unit according to the invention.
Figure 5:
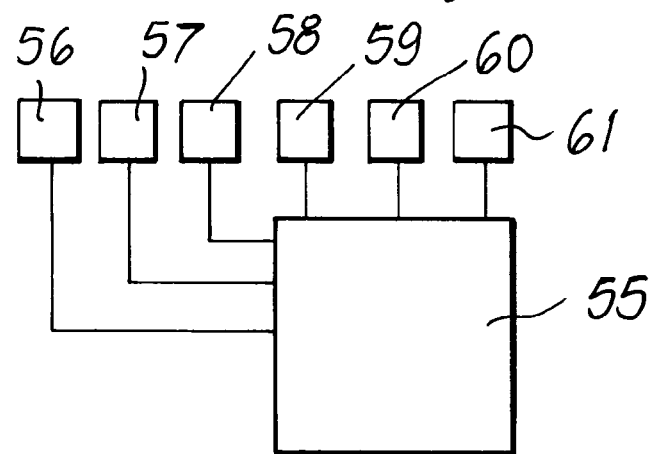
FIG. 5 is a diagram of the automatic management logic of the transmission unit according to the invention.

With reference to the figures, the reference numeral 1 generally designates a transmission unit particularly for driving screw feeders and auxiliary user devices of mixing trucks.

The unit 1 comprises: an off-center distribution device 2; a reduction unit 3, which is functionally connected to the off-center distribution device 2 and can be associated with the screw feeders of a mixing truck; a main friction clutch device 4, which is interposed between the off-center distribution device 2 and the reduction unit 3; a device 5 for reversing the direction of rotation of the screw feeders; and an auxiliary friction clutch device 6 for the reversing device 5.

The auxiliary friction clutch device 6 is in the disengaged configuration when the main friction clutch device 4 is in the engaged configuration; the main friction clutch device 4 is in the disengaged configuration when the auxiliary friction clutch device 6 is in the engaged configuration, and there is a neutral configuration in which both friction clutch devices, the main one 4 and the auxiliary one 6, are disengaged.

The off-center distribution device 2 comprises a containment case 7, which rotatably supports an input shaft 8, which can be connected to an external power take-off of a farming tractor and on which an input gear 9 is keyed.

The input gear 9 meshes with a first driven gear 10, which is keyed on a driven shaft 11 supported rotatably by the case 7, and with a second driven gear 12, which is supported rotatably by the case 7 and has internal slotted profiles 13 for connection to auxiliary user devices U, such as for example the pumps used for the hydraulic actuation of the elements of the unit 1 or of other services of the truck.

The reduction unit 3 is constituted by a first epicyclic reduction unit with one or more stages, which is shown only partially since it is of a conventionally known type; the shaft of its input sun gear has been designated by the reference numeral 14.

The reversing device 5 is arranged downstream of the off-center distribution device 2 and upstream of the main friction clutch device 4 along the direction of motion input; it is constituted by an epicyclic gear system, particularly by a second single-stage epicyclic reduction unit.

The main friction clutch device 4 is of the multiple-disk oil-bath type, which is per se known, and comprises a clutch bell 15, which is keyed onto the shaft of the input sun gear 14 of the reduction unit 3 and is mounted rotatably on the driven shaft 11 of the off-center distribution device 2.

The clutch bell 15 is provided internally with slots, recesses or the like for accommodating traction fins formed in driven disks 16. A hub 17 is keyed onto the driven shaft 11, and slots, recesses or the like are formed therein for accommodating driving fins formed in driving disks 18 which are interposed between the driven disks 16.

In order to actuate the main friction clutch device 4, there are first fluid-operated actuation means, which are constituted by a first piston 19 (which is annular and of the single-acting type), which forms, in cooperation with a collar 20 formed on the driven shaft 11, a first chamber 21, which is connected to a hydraulic circuit C, and by first elastic contrast means, which are constituted by first springs 22, which are interposed between the first piston 19, on the opposite side with respect to the first chamber 21, and a first complementary disk 23, which is keyed onto the driven shaft 11.

The reversing device 5 comprises: a sun gear 24, which is formed on the driven shaft 11 of the off-center distribution device 2; at least one planetary gear 25, which is supported rotatably by a gear carrier 26, which is mounted rotatably on the driven shaft 11; and a ring gear 27 with internal teeth, which rotates rigidly with the clutch bell 15 and meshes with the planetary gears 25.

The auxiliary friction clutch device 6 is of the multiple-disk oil-bath type and comprises disks 28 provided with traction fins accommodated in grooves, recesses or the like which are formed on the outer lateral surface of the gear carrier 26 and are interposed between locking disks 29, which are provided with respective traction fins accommodated in slots, recesses or the like formed on the internal surface of a containment body of the auxiliary friction clutch device 6, which is advantageously constituted by the case 7.

However, alternative embodiments of the body for containing the auxiliary friction clutch device 6 are also possible and might be constituted for example by a separate body which is coupled to the case 7 by means of a flange.

Second fluid-operated actuation means 30 are provided for the actuation of the auxiliary friction clutch device 6.

Moreover, the transmission unit 1 comprises a braking device 31, (negative safety device, which locks the screw feeders if no motion is occurring), which acts on the clutch bell 15 or on the shaft of the input sun gear 14 of the reduction unit 3 and is suitable to block the actuation of the screw feeders with both friction clutch devices, the main one 4 and the auxiliary one 6, in the disengaged configuration.

The braking device 31 is constituted by a brake disc 32, which rotates rigidly with the outer lateral surface of the clutch bell 15, and by at least one abutment surface 33, which is rotationally fixed and is formed within a containment body 34, which is rigidly coupled to the case 7 and to the casing 35 of the reduction unit 3.

Means for the pressure clamping of the brake disc 32 against the abutment surfaces 33 and fluid-operated means for deactivating said clamping means are further provided and are conveniently integrated with respect to the second fluid-operated actuation means 30.

The second fluid-operated actuation means 30 are constituted by a second piston 36 (which is annular and of the single-acting type), which is locked rotationally by means of a pin, not shown, and cooperates with an auxiliary piston 37, which is interposed between it and the containment body 34, and second elastic contrast means, which are constituted by second springs 38 interposed between the second piston 36 and a second complementary disk 39, which is rigidly coupled to the case 7.

The second springs 38 act as elastic pusher means, which press the second piston 36 against the brake disc 32, keeping it in contact with the abutment surface 33, the face of the second piston 36 also constituting an additional abutment surface 33 for the brake disc 32.

A second chamber 40 is formed between the second piston 36 and the auxiliary piston 37 and is connected to the hydraulic circuit C, while between the auxiliary piston 37 and the containment body 34 with which it abuts there is an auxiliary chamber 41, which is connected to the hydraulic circuit C.

The oil that enters the second chamber 40 (the auxiliary chamber 41 being connected to the discharge) pushes the second piston 36 toward the auxiliary friction clutch device 6, closing it and simultaneously deactivating the braking device 31 (the auxiliary piston 37 remaining in abutment against the containment body 34).

The oil that enters the auxiliary chamber 41 (the second chamber 40 being connected to the discharge) pushes the auxiliary piston 37 away from the braking device 31, deactivating it, but without engaging the auxiliary friction clutch device 6; i.e., the auxiliary piston 37 advances until it abuts against a surface formed in the case 7, thus assuming a neutral configuration, in which it acts neither on the auxiliary friction clutch device 6 nor on the braking device 31.

The hydraulic circuit C comprises connectors 42 for branching from the first chamber 21, which are formed in the driven shaft 11 and are connected to an axial duct 43, which is formed in said driven shaft and is associated with a first channel 44 for connection to a source 45 of pressurized fluid (oil).

Further, the hydraulic circuit C comprises a second channel 46 and a third channel 47, which is a branch of the first connection channel 44, for connecting respectively the second chamber 40 and the auxiliary chamber 41 to the source 45.

The source 45 comprises a hydraulic control unit, which in turn is constituted by a pump 48, for example of the rotor type, which is associated with the input shaft 8 of the off-center distribution device 2 and is provided with an intake port 49 and with a discharge port 50, which are connected to the internal volume of the case 7, and with a slide valve 51 (with four ways and three positions), which is interposed between the delivery port 52 and the discharge port 50 of the pump 48 and the three connecting channels 44, 46 and 47.

A pressure limiting valve 53 is provided at the delivery duct of the pump 48.

Two electric valves 54 drive the slide valve 51 in order to connect selectively the delivery port 52 to the first connecting channel 44 (and therefore also to the third connecting channel 47) or to the second connecting channel 46 and in order to connect the discharge port 50 respectively to the second connecting channel 46 or to the first connecting channel 44 (and therefore also to the third connecting channel 47).

By feeding oil into the first connecting channel 44 and therefore also into the third channel 47 and connecting to the discharge the second connecting channel 46, the braking device 31 is deactivated, the main friction clutch device 4 is closed, and the auxiliary friction clutch device 6 is kept open.

In this active configuration, the clutch bell 15, and therefore the shaft of the input sun gear 14 of the reduction unit 3, is turned by the driven shaft 11; therefore, the screw feeders are turned for work.

The driven shaft 11 and the clutch bell 15 turn rigidly the reversing device 5.

By feeding oil into the second connecting channel 46 and connecting to the discharge the first connecting channel 44, the braking device 31 is deactivated, the auxiliary friction clutch device 6 is closed, and the main friction clutch device 4 is kept open.

In this configuration in which the rotary motion of the screw feeders is reversed, the epicyclic gear system that constitutes the reversing device 5 behaves like an ordinary gear system: the gear carrier 26 is rigidly coupled to the case 7 and therefore fixed, and accordingly the sun gear 24 turns about their own fixed axes the planetary gears 25, which in turn rotate the ring gear 27, and therefore the clutch bell 15 and the shaft of the input sun gear 14 of the reduction unit 3, in the opposite direction with respect to the work direction.

Finally, the transmission unit 1 is provided with a central control and actuation unit 55, which is associated with the source 45 (hydraulic control unit: pump 48, slide valve 51, and electric valves 54) and with a plurality of detection devices, including in particular a first sensor 56 for detecting the pressure at the input of the hydraulic circuit C;

a second sensor 57 for detecting the actuation pressure of the main friction clutch device 4;

a third sensor 58 for detecting the actuation pressure of the auxiliary friction clutch device 6;

a first detector 59 for detecting the rotation rate (speed) in input to the driven shaft 11;

a second detector 60 for detecting the rotation rate (speed) in output on the clutch bell 15;

a sensor 61 for detecting torque at the input on the driven shaft 11 or on the input shaft 8.

The central control and actuation unit 55 allows to manage automatically the operation of the unit 1 and in particular the reversal of the motion of the screw feeders (by detecting any blockage, reversing motion only for the time needed for unblocking, and restoring normal operating conditions) and to lock automatically the unit 1 in case of abnormal operation.

In particular, the automatic management of the unit 1 consists in:

detecting any overload affecting the screw feeders according to a first criterion and/or a second criterion;

interrupting the active transmission of rotary motion to the screw feeders (setting to neutral; disengagement of the main friction clutch device 4);

reversing the direction of rotation of the screw feeders (deactivation of the braking device 31 and engagement of the auxiliary friction clutch device 6) for a time interval that can be determined according to a first principle or a second principle;

interrupting the transmission of the reversed motion to the screw feeders (disengagement of the auxiliary friction clutch device); and restoring the active transmission of rotary motion to the screw feeders, after excluding causes of hindrance determined according to a first rule, a second rule, a third rule and a fourth rule.

Further, the automatic management of the unit 1 allows to block the active transmission of rotary motion to the screw feeders if at least one of said causes of hindrance is detected during said transmission.

The first criterion consists in detecting (by means of the torque sensor 61) the torque (torsional moment) transmitted to the screw feeders and in comparing the detected value with a maximum reference value, overload being determined by the positive difference of the detected value with respect to the maximum reference value.

The second criterion consists in detecting the difference between the rotation rate in input and in output (by means of the first and second detectors 59 and 60) from the screw feeders, in comparing said difference with a maximum reference threshold, overload being determined by the positive difference between the detected difference and the maximum reference threshold.

The first principle for determining reversal time consists in time-controlling it (timer).

The second principle for determining reversal time consists in detecting the torque (torsional moment) transmitted to the screw feeders and in comparing the detected value with a maximum reference value, reversal time being determined by the negative difference between the detected value and the maximum reference value.

The first rule for determining a cause of failure to restore the working rotation conditions or their blockage consists in detecting the difference between the rotation rate in input and in output from the screw feeders (by means of the first and second detectors 59 and 60) and in comparing this difference with a maximum reference threshold, the cause of the hindrance/blockage being determined by the positive variation between the detected difference and the maximum reference threshold.

The second rule for determining a cause of failure to restore the work rotation conditions or of their blocking consists in detecting the supply pressure of the hydraulic circuit that actuates the main and auxiliary friction clutch devices 4 and 6, in comparing the detected pressure with a minimum reference value (lower than the reference pressure of the pressure limiting valve 53), the cause being determined by the negative difference between the detected value and the minimum reference value.

The third rule for determining a cause of failure to restore the work rotation conditions or of their blocking consists in detecting the closing pressure of the main and auxiliary friction clutch devices 4 and 6 and comparing the detected value with a minimum reference value, the cause being determined by the negative difference between the detected value and the minimum reference value.

The fourth rule for determining a cause of failure to restore the work rotation conditions or of their blocking consists in detecting the presence/position of the protection devices, the cause being given by their absence.

In practice it has been found that the described invention achieves the intended aim and objects.

The transmission unit according to the invention in fact allows to reverse the motion of the screw feeders of a mixing truck simply and rapidly without requiring any human intervention and without having to disconnect the external power take-off or reverse the travel of the truck and keeping unchanged the actuation and functionality of the auxiliary user devices, particularly of the pump that feeds the hydraulic circuit and of all the detection and measurement devices.

Further, the transmission unit according to the invention, by controlling the reversal time, allows to limit the loads that bear on the transmission elements, which move in reverse with respect to the direction in which for which they are designed.

Finally, the transmission unit according to the invention allows to manage automatically the detection of any blockage of the screw feeders and the maneuvers for reversing their motion until normal operating conditions are restored, to the full advantage of greater safety for operators and of greater protection of the transmission elements.

The invention thus conceived is susceptible of numerous modifications and variations, all of which are within the scope of the appended claims.

All the details may further be replaced with other technically equivalent ones.

In practice, the materials used, as well as the shapes and the dimensions, may be any according to requirements without thereby abandoning the scope of the protection of the appended claims.

The disclosures in Italian Patent Application No. MO2004A000226 from which this application claims priority are incorporated herein by reference.

What is claimed is:

1. A transmission unit for driving screw feeders and auxiliary user devices of mixing trucks, comprising: an off-center distribution device, which can be associated with an external power take-off and forms couplings for connection of auxiliary user devices; a reduction unit constituted by a first epicyclic reduction unit with at least one stage, which is functionally connected to said off-center distribution device and can be associated with screw feeders of a mixing truck; a main friction clutch device, which is interposed between said off-center distribution device and said reduction unit; a reversing device for reversing a direction of rotation of said screw feeders; and an auxiliary friction clutch device for said reversing device, wherein said main friction clutch device comprises: a clutch bell, which is keyed to a shaft of an input sun gear of said first epicyclic reduction unit and with which driven disks are associated for joint rotation therewith; and hub, which is keyed on a driven shaft of said off-center distribution device and with which driving disks interposed between said driven disks are associated for joint rotation therewith, and wherein said reversing device comprises: a sun gear, which is formed on said driven shaft of the off-center distribution device; at least one planetary gear supported by a gear carrier which is rotatable mounted on said driven shaft; and a ring gear with internal teeth, which rotates jointly with said clutch bell and is coupled to said planetary gears.

2. The unit according to claim 1, wherein said reversing device and said auxiliary friction clutch device are arranged upstream of said main friction clutch device and downstream of said off-center distribution device along the direction of input of the motion.

3. The unit according to claim 1, wherein said reversing device comprises an epicyclic gear system.

4. The unit according to claim 3, wherein said epicyclic gear system is a second single-stage epicyclic reduction unit.

5. The unit according to claim 1, wherein said auxiliary friction clutch device comprises disks which are associated for joint rotation with an outer lateral surface of said gear carrier and are interposed between locking disks, which are associated for joint rotation with a body for containing said auxiliary friction clutch device.

6. The unit according to claim 1, further comprising first fluid-operated actuation means for said main friction clutch device.

7. The unit according to claim 6, wherein said first actuation means comprise a first piston, which forms a first chamber which is connected to a hydraulic circuit, and first elastic contrast means, which are interposed between said first piston and a first complementary disk, which is keyed to said driven shaft.

8. The unit according to claim 7, further comprising second fluid-operated actuation means for actuating said auxiliary friction clutch device.

9. The unit according to claim 8, wherein said second actuation means comprise a second piston, which forms a second chamber which is connected to said hydraulic circuit, and second elastic contrast means, which are interposed between said second piston and a second complementary disk, which is rigidly coupled to said containment body.

10. The unit according to claim 1, further comprising a braking device, which acts on said clutch bell or on said shaft of the input sun gear of said first epicyclic reduction unit and is suitable to prevent the actuation of said screw feeders with both of said main and auxiliary friction clutch devices in the disengaged configuration.

11. The unit according to claim 10, wherein said braking device comprises a brake disc, which is coupled for joint rotation to the outer lateral surface of said clutch bell, and at least one abutment surface, which is rotationally fixed and is formed on the internal surface of a containment body and/or on a face of said second piston.

12. The unit according to claim 11, further comprising means for clamping by pressure said brake disc against said abutment surfaces.

13. The unit according to claim 12, wherein said pressure clamping means comprise elastic pusher means, which act between said brake disc and/or said abutment surfaces and an abutment element which is rigidly coupled to said containment body, fluid-operated means for deactivating said pressure clamping means being provided.

14. The unit according to claim 13, wherein said fluid-operated deactivation means comprise a third piston, which forms a third chamber connected to said hydraulic circuit.

15. The unit according to claim 14, wherein said second piston coincides with said third piston and said second elastic contrast means coincide with said elastic pusher means, an auxiliary piston being provided which is interposed between said second piston and said containment body and forms, in cooperation with them and in a mutually opposite arrangement, said second chamber and an auxiliary chamber, which is connected to said hydraulic circuit, said chambers forming said third chamber for the deactivation of said pressure clamping means respectively when said auxiliary friction clutch device is in the engaged configuration and said main friction clutch device is in the engaged configuration.

16. The unit according to claim 15, wherein said hydraulic circuit comprises branches that extend from said first chamber, are formed in said driven shaft and are connected to an actual duct, which is formed in said driven shaft and is associated with a first channel for connection to a source of pressurized fluid.

17. The unit according to claim 16, wherein said hydraulic circuit comprises a second and/or a third channel respectively for connecting said second chamber and said auxiliary chamber to said source.

18. The unit according to claim 17, wherein said third connecting channel is a branch of said first connecting channel.

19. The unit according to claim 18, wherein said source comprises a pump, which is associated with an input shaft of said off-center distribution device and is provided with an intake port and a discharge port, which are connected to internal volume of a containment case of said off-center distribution device, a slide valve interposed between a delivery port and a discharge port of said pump and said connecting channels, and electric valves for driving said slide valve for the selective connection of said delivery port to said first or second connecting channel and of said discharge port respectively to said second or first connecting channel.

20. A transmission unit for driving screw feeders and auxiliary user devices of mixing trucks, comprising: an off-center distribution device, which can be associated with an external power take-off and forms couplings for connection of auxiliary user devices; a reduction unit constituted by a first epicyclic reduction unit with at least one stage, which is functionally connected to said off-center distribution device and can be associated with screw feeders of a mixing trucks; a main friction clutch device, which is interposed between said off-center distribution device and said reduction unit; and a reversing device for reversing a direction of rotation of said screw feeders and an auxiliary friction clutch device for said reversing device, wherein said main fiction clutch device comprises: a clutch bell, which is keyed to a shaft of an input sun gear of said first epicyclic reduction unit and with which driven disks are associated for joint rotation therewith; and a hub, which is keyed on a driven shaft of said off-center distribution device and with which driving disks interposed between said driven disks are associated for joint rotation therewith, and wherein said reversing device comprises: a sun gear, which is formed on said driven shaft of the off-center distribution device; at least one planetary gear supported by a gear carrier which is rotatably mounted on said driven shaft; and a ring gear with internal teeth, which rotates jointly with said clutch bell and is coupled to said planetary gears, said auxiliary friction clutch device comprising a containment body thereof and disks which are associated for joint rotation with an outer lateral surface of said gear carrier and are interposed between locking disks which are associated for joint rotation with said containment body for containing said auxiliary fiction clutch device.

21. A transmission unit for driving screw feeders and auxiliary user devices of mixing trucks, comprising: an off-center distribution device, which can be associated with an external power take-off and forms couplings for connection of auxiliary user devices; a reduction unit constituted by a first epicyclic reduction unit with at least one stage, which is functionally connected to said off-center distribution device and can be associated with screw feeders of a mixing truck; a main friction clutch device, which is interposed between said off-center distribution device and said reduction unit; a reversing device for reversing a direction of rotation of said screw feeders; an auxiliary friction clutch device for said reversing device; first fluid-operated actuation means for actuating said main friction clutch device that comprise a first piston, which forms a first chamber which is connected to a hydraulic circuit, and first elastic contrast means, which is interposed between said first piston and a first complementary disk, which is keyed to said driven shaft; second fluid-operated actuation means for actuating said auxiliary friction clutch device, said second actuation means comprising a second piston, which forms a second chamber which is connected to said hydraulic circuit, and second elastic contrast means interposed between said second piston and a second complementary disk rigidly coupled to said containment body, and wherein said main friction clutch device comprises: a clutch bell, which is keyed to a shaft of an input sun gear of said first epicyclic reduction unit and with which driven disks are associated for joint rotation therewith; and a hub, which is keyed on a driven shaft of said off-center distribution device and with which driving disks interposed between said driven disks are associated for joint rotation therewith.

* * * * *